United States Patent [19]
Bassirat

[11] Patent Number: 6,088,003
[45] Date of Patent: Jul. 11, 2000

[54] SIX SECTOR ANTENNA STRUCTURE

[75] Inventor: Farhad Bassirat, Plano, Tex.

[73] Assignee: Nortel Networks Corporation, Montreal, Canada

[21] Appl. No.: 09/221,365

[22] Filed: Dec. 28, 1998

[51] Int. Cl.⁷ .................................................. H01Q 1/12
[52] U.S. Cl. ...................... 343/890; 343/893; 455/31.1
[58] Field of Search .............................. 343/890, 700 MS, 343/893, 853; 325/53; 342/374, 373; 455/423, 422, 31.1; H01Q 1/12

[56] References Cited

U.S. PATENT DOCUMENTS

| | | | |
|---|---|---|---|
| 4,144,496 | 3/1979 | Cunningham et al. | 325/53 |
| 5,861,844 | 1/1999 | Gilmore et al. | 342/374 |
| 5,936,580 | 8/1999 | Van Puijenbroek | 343/700 MS |

*Primary Examiner*—Hoanganh Le
*Attorney, Agent, or Firm*—Carr & Storm, L.L.P.; Jack D. Stone, Jr.

[57] ABSTRACT

An antenna structure which has a triangular platform defining three sides, each of which sides defines respective first and second sectors, each of which sectors defines a vertex located within the triangular platform. At least one antenna is positioned on each respective side for transmitting and receiving signals substantially only in the first sector of the respective side. At least one other antenna is positioned on each respective side for transmitting and receiving signals substantially only in the second sector of the respective side.

24 Claims, 4 Drawing Sheets

SIX SECTOR ANTENNA STRUCTURE

TECHNICAL FIELD

The invention relates generally to antennas and, more particularly, to an antenna structure for positioning antennas to cover six sectors of a wireless communication cell.

BACKGROUND

A wireless communication network is generally divided into cells which are circular is shape and sized according to the range with which antennas located at a Base Station Transceiver System (BTS), centrally located within the cell, can transmit to and receive from mobile stations without interfering with signals transmitted in adjacent cells. Each mobile station operating within a cell requires a certain amount of bandwidth to operate and, because the total bandwidth of base antennas is limited, the number of mobile stations which can operate within a cell is limited.

To increase the number of mobile stations which can operate within a cell, cells are typically divided into three sectors, each of which sectors cover 120° of the cell. Furthermore, to improve the reception of signals transmitted from mobile stations, two antennas are typically provided for each sector, such that each sector is provided with a total of six base antennas. Of the two antennas, one is a "main" antenna and the other one is a "diversity" antenna. The main antenna both transmits and receives signals to and from a mobile station, while the diversity antenna only receives signals from a mobile station. The diversity antenna is spaced apart from the main antenna to provide "space diversity" so that if one of the two antennas is not able to receive a signal transmitted from a mobile station, which may result from an obstruction in the path of transmitted signal, then the other antenna may receive the signal. A structure for supporting the six antennas for each cell is typically configured as a triangular platform, each side of which supports two antennas for one of three sectors of a cell.

To further increase number of mobile stations which can operate within a cell, cells may be divided into six sectors. There are, however, a number of problems associated with dividing cells into six sectors. For example, a hexagon-shaped (i.e., six-sided) platform configured for supporting twelve antennas with two antennas on each side sufficiently spaced apart to provide diversity would be six times larger than a triangular platform which provides that same space diversity for three sectors. Such a larger platform would cost more to build and install, be more visibly conspicuous, be more susceptible to weather such as wind currents. A larger platform would also weigh more and may also require a stronger mast to support it. While a six-sector platform is being installed to replace a three-sector platform, downtime would also be incurred during which mobile stations in the cell would not be operable. Alternatively, if a smaller platform is used which compromises the space diversity, then signal quality is degraded.

Accordingly, a continuing search has been directed to the development of an antenna structure which would support a six sector cell with acceptable space diversity to maintain good signal quality, but which does not require that a new larger and more costly platform be installed, and possible a new mast also be installed, during which installation wireless communications in the cell would be interrupted.

SUMMARY

The present invention, accordingly, provides an antenna structure which supports a six sector cell. The antenna structure of the present invention has a triangular platform defining three sides, each of which sides defines respective first and second sectors, each of which sectors defines a vertex located within the triangular platform. At least one antenna is positioned on each respective side for transmitting and receiving signals substantially only in the first sector of the respective side. At least one other antenna is positioned on each respective side for transmitting and receiving signals substantially only in the second sector of the respective side.

In one embodiment, two dual polarized antennas are mounted on each of the three sides of the antenna structure so that one dual polarized antenna serves each of six sectors of a cell. In another embodiment, two main antennas and two diversity antennas are mounted on each of the three sides of the antenna structure so that one main antenna and one spaced-apart diversity antenna serve each of six sectors of a cell.

By use of the present invention, capacity of a BTS may be increased by a factor of at least 1.7 without incurring high installation costs and interruption in service.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
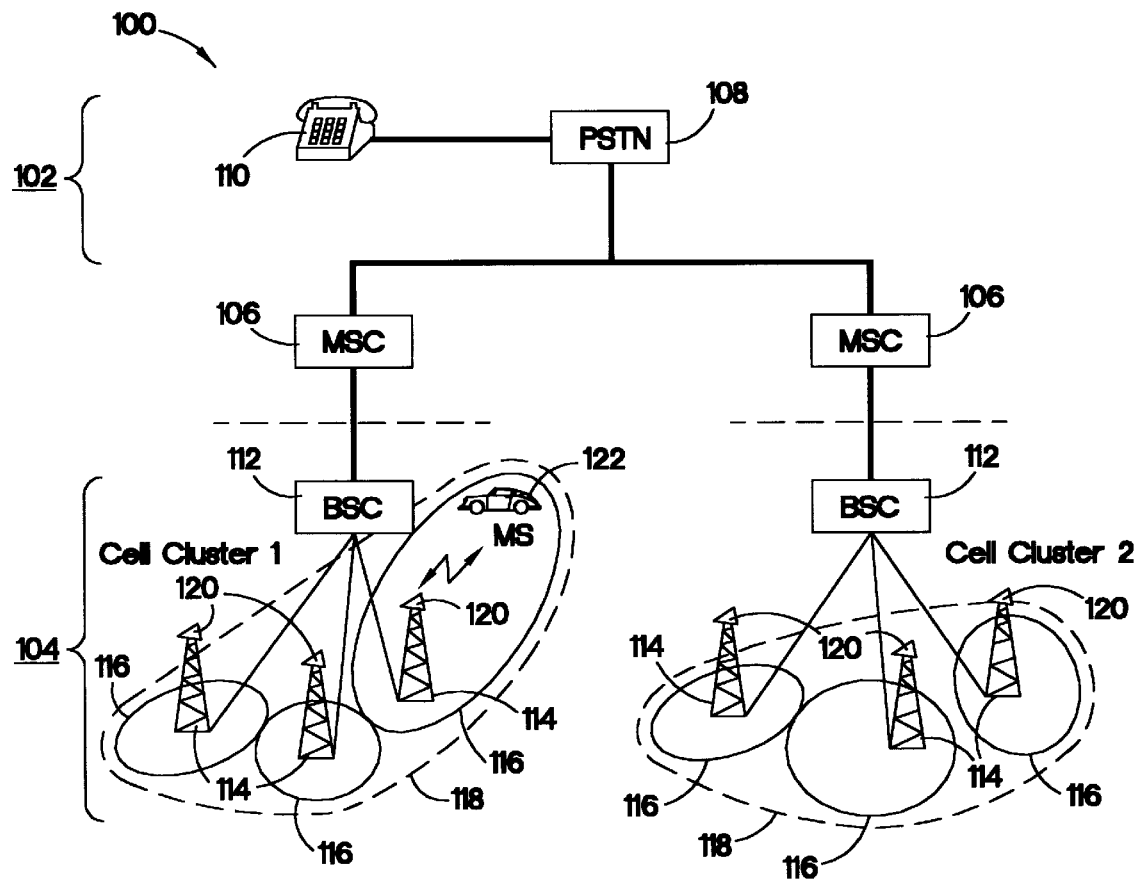
FIG. 1 is a schematic diagram depicting a communications network.

In the discussion of the FIGURES the same reference numerals will be used throughout to refer to the same or similar components. In the interest of conciseness, various components well-known to the art, such as a Signaling System 7 (SS7), feed lines to antennas, and the like, necessary for the operation of the a communications network antenna, have not been shown or discussed.

Referring to FIG. 1 of the drawings, the reference numeral 100 generally designates a communications network having a wireline network 102 and a wireless network 104 which interface through at least two Mobile Switching Centers (MSC's) 106. The wireline network 102 includes a Public Switched Telephone Network (PSTN) 108 having at least one telephone 110 connected thereto. The wireless network 104 includes at least one Base Station Controller (BSC) 112 connected between each MSC 106 and a plurality of Base Station Transceiver Systems (BTS's, not shown) for controlling and managing the BTS's. Each BTS is connected to an antenna tower 114 centrally located within a cell 116 of a cell cluster 118 served by each BSC 112. A triangular platform 120 is positioned atop each antenna tower 114 for providing a structure onto which a plurality of antennas (not shown in FIG. 1), such as microstrip antennas, well-known in the art, are mounted. The antennas are configured for transmitting and receiving signals to and from at least one mobile stations 122. While the triangular platforms 120 are shown mounted atop antenna towers, the platforms may be mounted onto any suitable support, such as a building (not shown), which permits the platform and antennas mounted thereto to be generally elevated above mobile stations 122 located within a cell 116. A communications network, such the network 100, is considered to be well-known in the art and, therefore, will not be discussed in greater detail, except with respect to the antennas mounted onto the platforms 120, which is discussed further below with respect to FIGS. 2–4.

Figure 2:
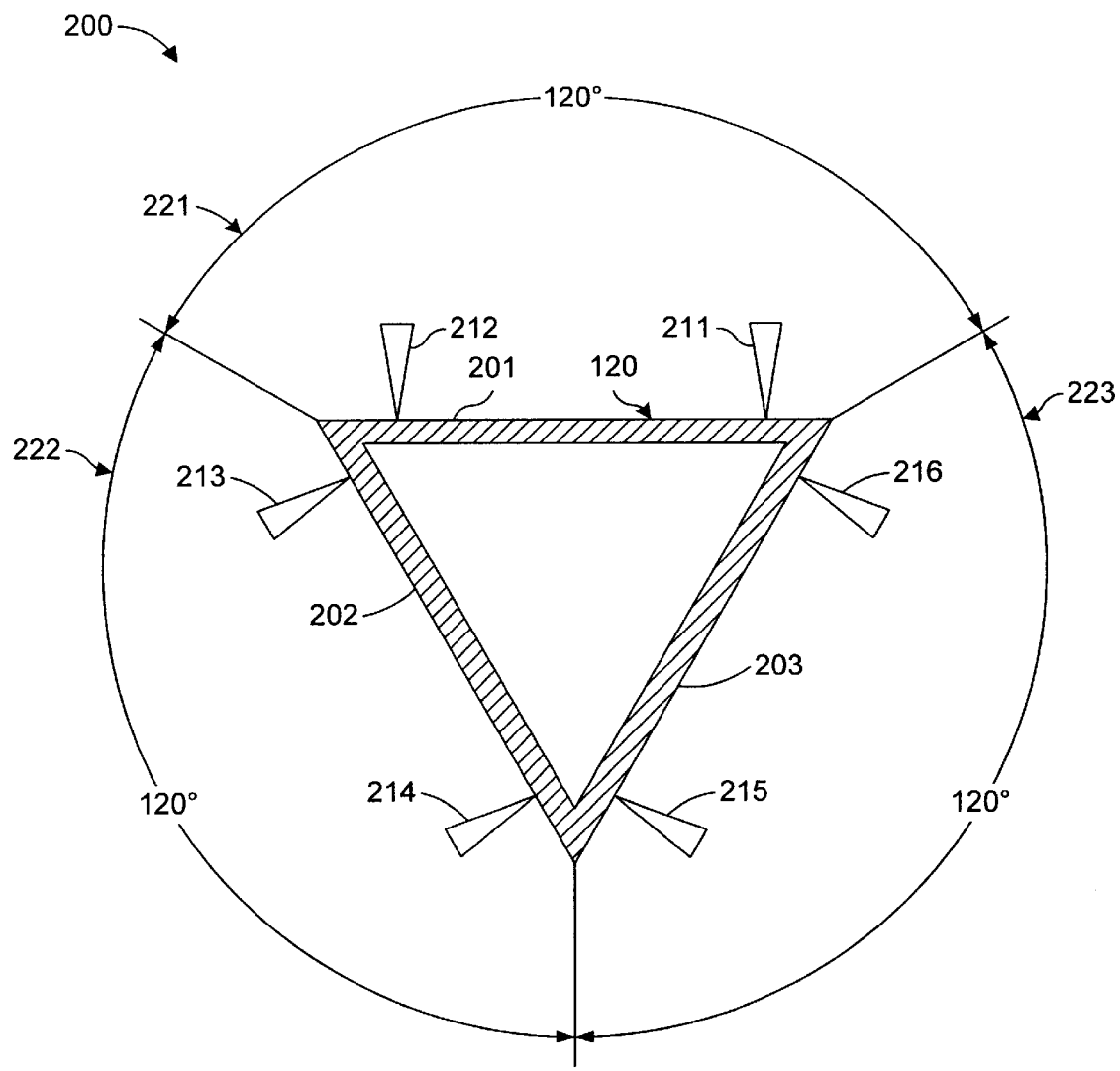
FIG. 2 is a schematic diagram of a prior art antenna structure utilized in the communications network of FIG. 1.

FIG. 2 shows a plan view of an antenna structure 200 embodying features of the prior art. The antenna structure 200 generally comprises the triangular platform 120 mounted atop an antenna tower 114 (FIG. 1), or other suitable structure, such as a building (not shown) The platform 120 includes a first side 201, a second side 202, and third side 203. A main antenna 211 and a diversity antenna 212 spaced apart from the main antenna 210 are mounted on, and generally perpendicular to, the first side 201 of the platform 120 for serving mobile stations 122 (FIG. 1) located in a 120° sector 221 of a wireless communication cell 116 FIG. 1), the vertex of which sector is located in the triangular platform. Similarly, a main antenna 213 and a diversity antenna 214 spaced apart from the main antenna 213 are mounted on, and generally perpendicular to, the second side 202 of the platform 120 for serving mobile stations 122 (FIG. 1) located in a 120° sector 222 of a wireless communication cell 116 (FIG. 1), the vertex of which sector is located in the triangular platform. Similarly, a main antenna 215 and a diversity antenna 216 spaced apart from the main antenna 215 are mounted on, and generally perpendicular to, the third side 203 of the platform 120 for serving mobile stations 122 (FIG. 1) located in a 120° sector 223 of a wireless communication cell 116 (FIG. 1), the vertex of which sector is located in the triangular platform. The antenna structure 200 shown in FIG. 1 and the operation thereof are considered to be well-known in the art and, therefore, will not be described in further detail.

A drawback with the foregoing antenna structure 200 is that the number of sectors and, hence, the number of mobile stations 122, which it can serve is limited to only three sectors and, within each respective sector, is limited by the bandwidth of the respective antennas serving that sector.

Figure 3:
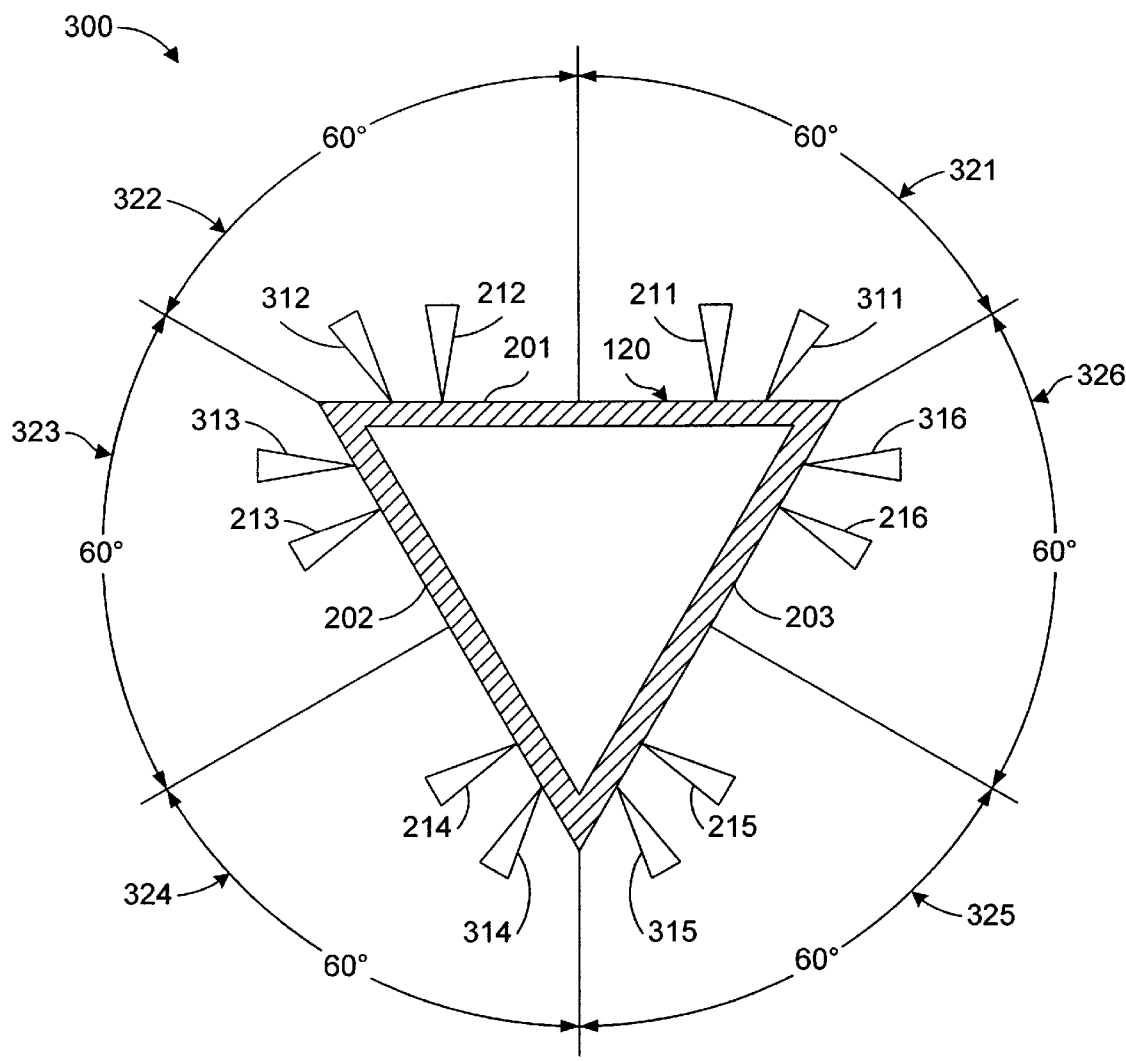
FIG. 3 is a schematic diagram of an antenna structure embodying features of the present invention.

In FIG. 3, an embodiment of the present invention is shown which permits six generally adjacent, non-overlapping, sectors to be served by an antenna structure designated herein by the reference numeral 300. In the embodiment of the antenna structure 300, six slant dual polarized antennas 311, 312, 313, 314, 315, and 316 are mounted on the platform 120 adjacent to the antennas 211, 212, 213, 214, 215, and 216, respectively, for serving 60° sectors 321, 322, 323, 324, 325, and 326, respectively, each of which sectors define a vertex located in the triangular platform 120. Each of the slant dual polarized antennas 311, 312, 313, 314, 315, and 316 are generally oriented on the sides 201, 201, 202, 202, 203, and 203, respectively, of the platform 120 to transmit and receive signals, in two orthogonal polarization planes, preferably oriented at ±45° from a horizontal plane, to and from mobile stations 122 (FIG. 1) located in the sectors 321, 322, 323, 324, 325, and 326, respectively. Dual polarized antennas such as the antennas 311, 312, 313, 314, 315, and 316 are considered to be well-known and are commercially available from suppliers such as Til-Tek, Scala, and Cellwave.

In operation, the antennas 311, 312, 313, 314, 315, and 316 transmit to mobile stations located in the sectors 321, 322, 323, 324, 325, and 326, respectively, and receive signals in two orthogonal polarization planes, preferably oriented at ±45° from a horizontal plane. Because the signals are received in two orthogonal polarizations, there is no need for two physically separate antennas, as taught by the prior art, to provide space diversity.

The antenna configuration shown in FIG. 3 may alternatively be operated across the three sectors 221, 222, and 223 (FIG. 2) to carry a second carrier in addition to a first carrier without requiring any additional antennas. This may be achieved by disconnecting the signal cables (not shown) from the dual polarized antennas 311, 312, 313, 314, 315, and 316 and reconnecting the cables to the three-sector antennas 211, 212, 213, 214, 215, and 216. The first carrier may then transmit signals from the antennas 211, 213, and 215, and the second carrier may transmit signals from the antennas 212, 214, and 216. The disconnection and reconnection operations may be achieved by using switches, not shown. Each of the first and second carriers may receive signals from all of the antennas 211, 212, 213, 214, 215, and 216. When thus servicing two carriers, the dual polarized antennas 311, 312, 313, 314, 315, and 316 are not then needed and may, optionally, be removed.

By the use of the antenna structure of the present invention as shown in FIG. 3, the area served by the antenna structure may be readily divided into six sectors, and the number of mobile stations that may be served increased by a factor of at least 1.7. Furthermore, since the antennas 311, 312, 313, 314, 315, and 316 may be mounted on the same platform 120 used by conventional antenna structures, no time is required to replace the platform 120 with a much larger and more costly hexagonal platform which would also be susceptible to poor weather conditions. Additionally, the antennas 311, 312, 313, 314, 315, and 316 may be installed and put into operation with very minimal, if any, interruption to service of the mobile stations in the area. Furthermore, no minimum diversity is required to for the antennas as is required when using conventional antennas. Still further, a second carrier may be carried without requiring any additional antennas.

Figure 4:
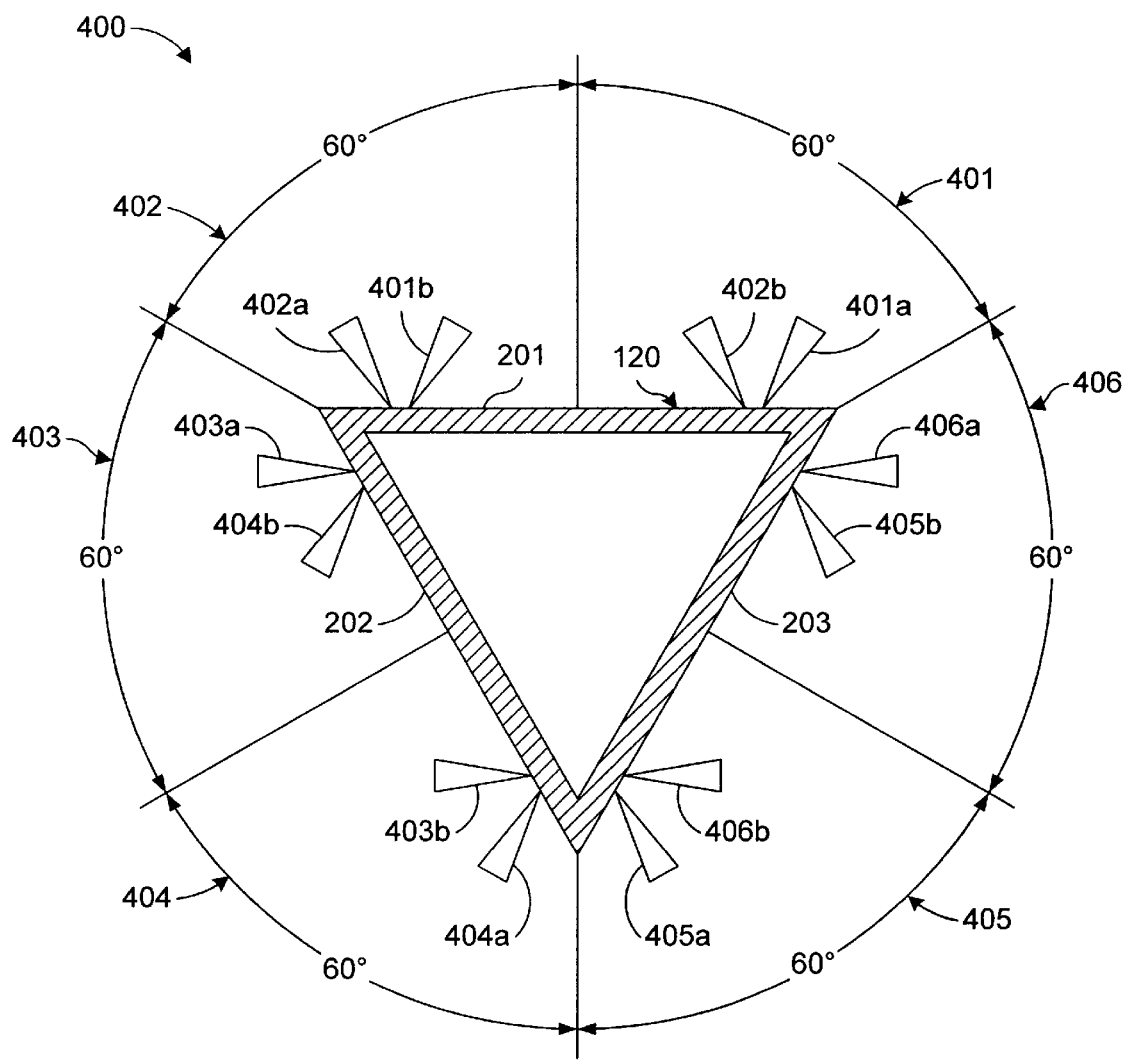
FIG. 4 is a schematic diagram of an alternate embodiment of an antenna structure embodying features of the present invention.

An alternate embodiment of the present invention is shown in FIG. 4, in which the reference numeral 400 refers in general to an antenna structure operable in six generally adjacent, non-overlapping sectors, having vertexes located in the triangular plate 120, but which antenna structure does not require dual polarized antennas. To that end, the antenna structure 400 utilizes interleaved main and diversity antennas for each of six sectors, which antennas are similar to the conventional antennas depicted in FIG. 1, but which are interleaved and transmit and receive signals through a narrow-beam antenna configured for six sectors, instead of a wide-beam antenna configured for three sectors as depicted by the antennas shown in FIG. 2.

Accordingly, a suitably spaced-apart main antenna 401*a* and diversity antenna 401*b* are positioned proximate to opposite ends of the side 201, for serving mobile stations 122 (FIG. 1) located in an approximately 60° sector 401 of a wireless communication cell 116 (FIG. 1). Similarly, a suitably spaced-apart main antenna 402*a* and diversity antenna 402*b* are positioned proximate to opposite ends of the side 201, for serving mobile stations 122 (FIG. 1) located in an approximately 60° sector 402 of a wireless communication cell 116 (FIG. 1). Similarly, a suitably spaced-apart main antenna 403*a* and diversity antenna 403*b* are positioned proximate to opposite ends of the side 202 for serving mobile stations 122 (FIG. 1) located in an approximately 60° sector 403 of a wireless communication cell 116 (FIG. 1). Similarly, a suitably spaced-apart main antenna 404*a* and diversity antenna 404*b* are positioned proximate to opposite ends of the side 202 for serving mobile stations 122 (FIG. 1)

located in an approximately 60° sector 404 of a wireless communication cell 116 (FIG. 1). Similarly, a suitably spaced-apart main antenna 405a and diversity antenna 405b are positioned proximate to opposite ends of the side 203 for serving mobile stations 122 (FIG. 1) located in an approximately 60° sector 405 of a wireless communication cell 116 (FIG. 1). Similarly, a suitably spaced-apart main antenna 406a and diversity antenna 406b are positioned proximate to opposite ends of the side 203 for serving mobile stations 122 (FIG. 1) located in an approximately 60° sector 406 of a wireless communication cell 116 (FIG. 1).

In the operation of the antenna structure 400 of the present invention, the main antenna 401a transmits signals to, and both the main antenna 401a and the diversity antenna 401b receive signals from, mobile stations 122 (FIG. 1) located in the sector 401. Similarly, the main antenna 402a transmits signals to, and both the main antenna 402a and the diversity antenna 402b receive signals from, mobile stations 122 (FIG. 1) located in the sector 402. Similarly, the main antenna 403a transmits signals to, and both the main antenna 403a and the diversity antenna 403b receive signals from, mobile stations 122 (FIG. 1) located in the sector 403. Similarly, the main antenna 404a transmits signals to, and both the main antenna 404a and the diversity antenna 404b receive signals from, mobile stations 122 (FIG. 1) located in the sector 404. Similarly, the main antenna 405a transmits signals to, and both the main antenna 405a and the diversity antenna 405b receive signals from, mobile stations 122 (FIG. 1) located in the sector 405. Similarly, the main antenna 406a transmits signals to, and both the main antenna 406a and the diversity antenna 406b receive signals from, mobile stations 122 (FIG. 1) located in the sector 406.

In addition to the advantages described above with respect to the antenna structure 300 depicted in FIG. 3, the antenna structure 400 depicted in FIG. 4 may also be used where dual polarization antennas are not permitted, for example, as a result of regulations by the United States Federal Communications Commission (FCC).

It is understood that the present invention can take many forms and embodiments. Accordingly, several variations may be made in the foregoing without departing from the spirit or the scope of the invention. For example, in the embodiment of the antenna structure 300 shown in FIG. 3, in lieu of the six slant dual polarized antennas 311, 312, 313, 314, 315, and 316, dual polarized antennas may be used which are polarized in the horizontal and vertical planes.

In another example of a variation, the precise relative position of the antennas may vary from that shown in the FIGURES. For example, in FIG. 2, the antennas 211, 212, 213, 214, 215, and 216 may be exchanged with the antennas 311, 312, 313, 314, 315, and 316, respectively, while maintaining the same general orientation for each respective antenna.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. An antenna structure comprising:
    a triangular platform having a first side, a second side, and a third side, each of which sides defines a respective first sector and a respective second sector, each of which sectors defines a vertex located within the triangular platform;
    at least a first antenna positioned on each respective side for transmitting and receiving signals substantially only in the first sector of the respective side; and
    at least a second antenna positioned on each respective side for transmitting and receiving signals substantially only in the second sector of the respective side.

2. The antenna structure of claim 1 wherein each of the at least a first antennas is a dual polarized antenna, and wherein each of the at least a second antennas is a dual polarized antenna.

3. The antenna structure of claim 1 wherein each of the at least a first antennas is a slant dual polarized antenna, and wherein each of the at least a second antennas is a dual polarized antenna.

4. The antenna structure of claim 1 wherein each of the at least a first antennas comprises a main antenna configured for transmitting and receiving signals substantially only in the first sector of the respective side, and a diversity antenna configured for receiving signals substantially only in the first sector of the respective side, the main and diversity antennas being spaced apart from each other of the respective side; and wherein each of the at least a second antennas comprises a main antenna configured for transmitting and receiving signals substantially only in the second sector of the respective side, and a diversity antenna configured for receiving signals substantially only in the second sector of the respective side, the main and diversity antennas being spaced apart from each other of the respective side.

5. The antenna structure of claim 1 wherein each of the sectors inscribes an arc of about 60°.

6. The antenna structure of claim 1 wherein the sectors are generally adjacent sectors.

7. The antenna structure of claim 1 wherein the sectors are generally adjacent sectors, each of which sectors inscribes an arc of about 60°.

8. The antenna structure of claim 1 wherein the antenna structure is mounted atop an antenna tower substantially centrally located within a cell of a wireless communications network.

9. The antenna structure of claim 1 wherein the antenna structure is mounted on a building substantially centrally located within a cell of a wireless communications network.

10. The antenna structure of claim 1 wherein the transmitted and received signals are signals of a first carrier, and wherein the antenna structure further comprises a main antenna and a diversity antenna on each respective side for transmitting and receiving signals from a second carrier substantially in both the first sector and the second sector of the respective side.

11. An antenna structure comprising:
    a triangular platform having a first side, a second side, and a third side, each of which sides defines a respective first sector and a respective second sector, each of which sectors defines a vertex located within the triangular platform;
    a first dual polarized antenna positioned on each respective side for transmitting and receiving signals substantially only in the first sector of the respective side; and
    a second dual polarized antenna positioned on each respective side for transmitting and receiving signals substantially only in the second sector of the respective side.

12. The antenna structure of claim 11 wherein the first dual polarized antenna is a first slant dual polarized antenna, and the second dual polarized antenna is a second slant dual polarized antenna.

13. The antenna structure of claim 11 wherein each of the sectors inscribes an arc of about 60°.

14. The antenna structure of claim 11 wherein the sectors are generally adjacent sectors.

15. The antenna structure of claim 11 wherein the sectors are generally adjacent sectors, each of which sectors inscribes an arc of about 60°.

16. The antenna structure of claim 11 wherein the antenna structure is mounted atop an antenna tower substantially centrally located within a cell of a wireless communications network.

17. The antenna structure of claim 11 wherein the antenna structure is mounted on a building substantially centrally located within a cell of a wireless communications network.

18. The antenna structure of claim 11 wherein the transmitted and received signals are signals of a first carrier, and wherein the antenna structure further comprises a main antenna and a diversity antenna on each respective side for transmitting and receiving signals from a second carrier substantially in both the first sector and the second sector of the respective side.

19. An antenna structure comprising:
   a triangular platform having a first side, a second side, and a third side, each of which sides defines a respective first sector and a respective second sector, each of which sectors defines a vertex located within the triangular platform;
   a first main antenna positioned on each respective side for transmitting and receiving signals substantially only in the first sector of the respective side;
   a first diversity antenna positioned on each respective side for receiving signals substantially only in the first sector of the respective side, wherein the first main antenna and the first diversity antenna are spaced apart from each other of the respective side;
   a second main antenna positioned on each respective side for transmitting and receiving signals substantially only in the second sector of the respective side; and
   a second diversity antenna positioned on each respective side for receiving signals substantially only in the second sector of the respective side, wherein the second main antenna and the second diversity antenna are spaced apart from each other of the respective side.

20. The antenna structure of claim 19 wherein each of the sectors inscribes an arc of about 60°.

21. The antenna structure of claim 19 wherein the sectors are generally adjacent sectors.

22. The antenna structure of claim 19 wherein the sectors are generally adjacent sectors, each of which sectors inscribes an arc of about 60°.

23. The antenna structure of claim 19 wherein the antenna structure is mounted atop an antenna tower substantially centrally located within a cell of a wireless communications network.

24. The antenna structure of claim 19 wherein the antenna structure is mounted on a building substantially centrally located within a cell of a wireless communications network.

* * * * *